(12) United States Patent
Augustsson

(10) Patent No.: US 6,456,754 B1
(45) Date of Patent: Sep. 24, 2002

(54) WDM TRANSMITTER AND RECEIVER

(75) Inventor: Torsten Augustsson, Upplands Väsby (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/410,045

(22) Filed: Oct. 1, 1999

(30) Foreign Application Priority Data

Oct. 2, 1998 (SE) .............................................. 9803349

(51) Int. Cl.[7] .............................................. G02B 6/293
(52) U.S. Cl. ........................................ 385/24; 359/127
(58) Field of Search ................................ 385/3, 24, 16, 385/17; 359/127, 115, 173, 154

(56) References Cited

U.S. PATENT DOCUMENTS

| | | | | |
|---|---|---|---|---|
| 6,005,992 A | * | 12/1999 | Augustsson et al. | 385/16 |
| 6,222,955 B1 | * | 4/2001 | Legali et al. | 385/20 |
| 6,253,000 B1 | * | 6/2001 | Madsen et al. | 385/16 |
| 6,289,147 B1 | * | 9/2001 | Bulthuis et al. | 385/24 |
| 6,292,597 B1 | * | 9/2001 | Lagali et al. | 385/1 |
| 6,292,599 B1 | * | 9/2001 | Augustsson | 385/16 |

OTHER PUBLICATIONS

US 590929A (Christopher Richard Doerr et al), Jun. 1, 1999.
US 5617234 A (Masafumi Koga et al), Apr. 1, 1997.
EP 0639782 A1 (Nippon Telegraph and Telephone Corporation), Feb. 22, 1995.

* cited by examiner

Primary Examiner—John D. Lee
Assistant Examiner—Sarah U Song
(74) Attorney, Agent, or Firm—Burns, Doane, Swecker & Mathis, L.L.P.

(57) ABSTRACT

The present invention relates to an arrangement and to a method for wavelength selecting transmission, said arrangement comprising two N×N MMI waveguides (10 and 20), where N≧2, 2 (N−1) number of lasers (1 and 2) and N-number of Mach-Zehnder waveguides (31, 32, 33, 34 and 35). A first N×N MMI waveguide (10) is coupled with N−1 number of lasers (1) and a free access waveguide (15) on a first side, and N-number of Mach-Zehnder waveguides (31, 32, 33, 34 and 35) of mutually different lengths on a second side. The free access waveguide (15) is coupled with a last port (a15) on the first side of the first MMI waveguide (10). A second N×N MMI waveguide (20) is coupled with said N-number of Mach-Zehnder waveguides (31, 32, 33, 34 and 35) on a second side and N−1 number of lasers 82) and a free access waveguide (21) on a first side, where N−1 number of Mach-Zehnder waveguides (31, 32, 33 and 34) include a trimming section (41, 42, 43 and 44). The free access waveguide (21) is coupled with a first port (a21) on the first side of the second MMI waveguide (20). A first to a last Mach-Zehnder waveguide (31, 32, 33, 34 and 35) are arranged between a first to a last port (b11, b12, b13, b14 and b15) on a second side of the first MMI waveguide (10) and a last to a first port (b25, b24, b23, b22 and b21) on a second side of the second MMI waveguide (20).

5 Claims, 2 Drawing Sheets

WDM TRANSMITTER AND RECEIVER

FIELD OF INVENTION

The present invention relates generally to a method and to an optical arrangement in an optical network, and more specifically to a method and to an arrangement for achieving tunable optical transmission or reception on optical wavelength channels.

BACKGROUND OF THE INVENTION

A number of different methods of further increasing the capacity of existing optical networks are known to the art. One way is to use so-called wavelength multiplexing (WDM) techniques for improving the extent to which available bandwidths can be utilised on an optical fibre in an optical network. The wavelength can also be used in an optical network as address information, i.e. the information can be multiplexed on a number of channels that can then be processed individually in the network.

This requires components that are functional in multiplexing/demultiplexing transmission channels that lie on different carrier wave lengths. It may also be desirable to change the transmitter wavelength of a given transmitter (laser). A component such as a wavelength selecting transmitter can then be used.

The drawbacks with known techniques capable of achieving wavelength selective transmission or WDM reception is that they are often complex, expensive and difficult to implement. A primary difficulty resides in tuning over a wide frequency range with the aid of solely one single laser.

SUMMARY OF THE INVENTION

Any one of a number of different known methods can be used to increase the capacity of an optical transmission system. For instance, in the case of wavelength multiplexing, transmission channels are multiplexed and demultiplexed on different carrier wave lengths to and from an information stream. These multiplexing and demultiplexing processes require the presence of optical wavelength selective devices. In order to change the transmission wavelength of a given transmitter, such devices as wavelength selecting transmitters are necessary.

An object of the present invention is to reduce the complexity and lower the costs of a wavelength selecting transmitter or a WDM receiver (Wavelength Division Multiplexing).

This is achieved in accordance with the invention with a wavelength selecting transmitter that includes two N×N MMI waveguides, where N≧2, 2(N−1) lasers and N-number of Mach-Zehnder waveguides. A first N×N MMI waveguide is arranged with N−1 number of lasers and a free access waveguide on a first side, and N-number of Mach-Zehnder waveguides of different lengths on a second side. The free access waveguide is coupled with a last port on the first side of the first MMI waveguide. A second N×N MMI waveguide is coupled with said N-number of Mach-Zehnder waveguides on a second side and the N−1 number of lasers and an access waveguide on a first side, where at least one Mach-Zehnder waveguide can include at least one trimming section. The free access waveguides is coupled with a first port on the first side of the second MMI waveguide. A first to a last Mach-Zehnder waveguide are disposed between a first to a last port on a second side of the first MMI waveguide and a last to a first port on a second side of the second MMI waveguide.

In a preferred embodiment of the inventive wavelength selecting transmitter, all of the N−1 number of lasers coupled with the first N×N MMI waveguide transmit with different light wavelengths, these wavelengths being the same wavelengths as those transmitted by the N−1 number of different lasers coupled with the second N×N MMI waveguide.

In another preferred embodiment of the inventive wavelength selecting transmitter, an external modulator is coupled with the free access waveguides disposed on the first and on the second MMI waveguide.

In a first embodiment of a WDM receiver, the receiver includes two N×N MMI waveguides, where N≧2, two access waveguides for incoming wavelength channels, 2(N−1) number of access waveguides for outgoing wavelength channels, and N-number of Mach-Zehnder waveguides of mutually different lengths. A first N×N MMI waveguide is arranged with a first access waveguide to a last port of the first side of incoming wavelength channels which are provided with means for transmitting on at least one wavelength channel and N−1 number of access waveguides for outgoing wavelength channels on a first side and N-number of Mach-Zehnder waveguides on a second side. A second N×N MMI waveguide is arranged with said N-number of Mach-Zehnder waveguides on a second side and a second access waveguide for incoming wavelength channels coupled with a first port on a first side which is coupled with means for transmitting at least one wavelength channel and N−1 number of access waveguides for outgoing wavelength channels on the remaining ports on said first side. At least one Mach-Zehnder waveguide can include at least one trimming section. A first to a last Mach-Zehnder waveguide are disposed between a first to a last port on the second side of the first MMI waveguide and a last to a first port on the second side of the second MMI waveguide.

In a preferred embodiment of the inventive WDM receiver, said receiver includes transmitter means which includes a multiplexer with which at least one laser is coupled.

According to another preferred embodiment of the inventive WDM receiver, wavelengths are transmitted from the first MMI waveguide that are different to the wavelength channels transmitted from the second MMI waveguide.

According to a further preferred embodiment of the inventive WDM receiver, there is transmitted from the first MMI waveguide at least one wavelength channel which is the same as at least one wavelength channel transmitted from the second MMI waveguide.

In a method for wavelength selection or WDM transmission, there is transmitted q of N−1 number of wavelength channels to q of N−1 number of access waveguides for incoming wavelength channels disposed on a first side of a first N×N MMI waveguide, where N≧2 and where 1≦q≦N−1. N−1 number of wavelength channels are transmitted to N−1 number of access waveguides for incoming wavelength channels disposed on a first side of a second N×N MMI waveguide, where N≧2. The wavelength channels are then transmitted through said first and said second N×N MMI waveguides. The wavelength channels are excited into N-number of Mach-Zehnder waveguides of mutually different lengths disposed on a second side of the first and the second N×N MMI waveguides. It is possible to change the phase of said wavelength channels in at least one Mach-Zehnder waveguide, by means of at least one trimming section disposed in a Mach-Zehnder waveguide. Said wavelength channels are then excited into the second side of the first and the second N×N MMI waveguides and are then transmitted through the first and the second N×N MMI waveguides and thereafter excited out on a first access waveguide for outgoing wavelength channels on the first side of the first N×N MMI waveguide and a second access and waveguide for outgoing wavelength channels on the first side of the second N×N MMI waveguide.

According to one WDM receiving method, N−1 number of wavelength channels are transmitted to an access waveguide for incoming wavelength channels disposed on a first side of a first N×N MMI waveguide, where N≧2. N−1 number of wavelength channels are transmitted to an access waveguide for incoming wavelength channels disposed on a first side of a second N×N MMI waveguide, where N≧2. Said wavelength channels are transmitted through said first and said second N×N MMI waveguides. Said wavelength channels are excited into N-number of Mach-Zehnder waveguides of mutually different lengths disposed on a second side of the first and second N×N MMI waveguides. The phase of said wavelength channels can be changed by at least on trimming section in at least one Mach-Zehnder waveguide. Said wavelength channels are excited into the second side of the first and the second N×N MMI waveguides. Said wavelength channels are transmitted through the first and the second N×N MMI waveguide and thereafter excited out on N−1 number of access waveguides for outgoing wavelength channels disposed on the first side of the first N×N MMI waveguide and on N−1 number of access waveguides for outgoing wavelength channels disposed on the first side of the second N×N MMI waveguide.

The object of the present invention is to obtain a wavelength selecting transmitter module or receiver module that work in pairs and therewith require only one in-trimming.

One advantage afforded by the present invention is that the arrangement can transmit and receive carrier wavelengths simultaneously on the same or on different wavelengths which require only one in-trimming.

The invention will now be described in more detail with reference to preferred embodiments thereof and with reference to the accompanying drawings.

DESCRIPTION OF PREFERRED EMBODIMENTS

Figure 1:
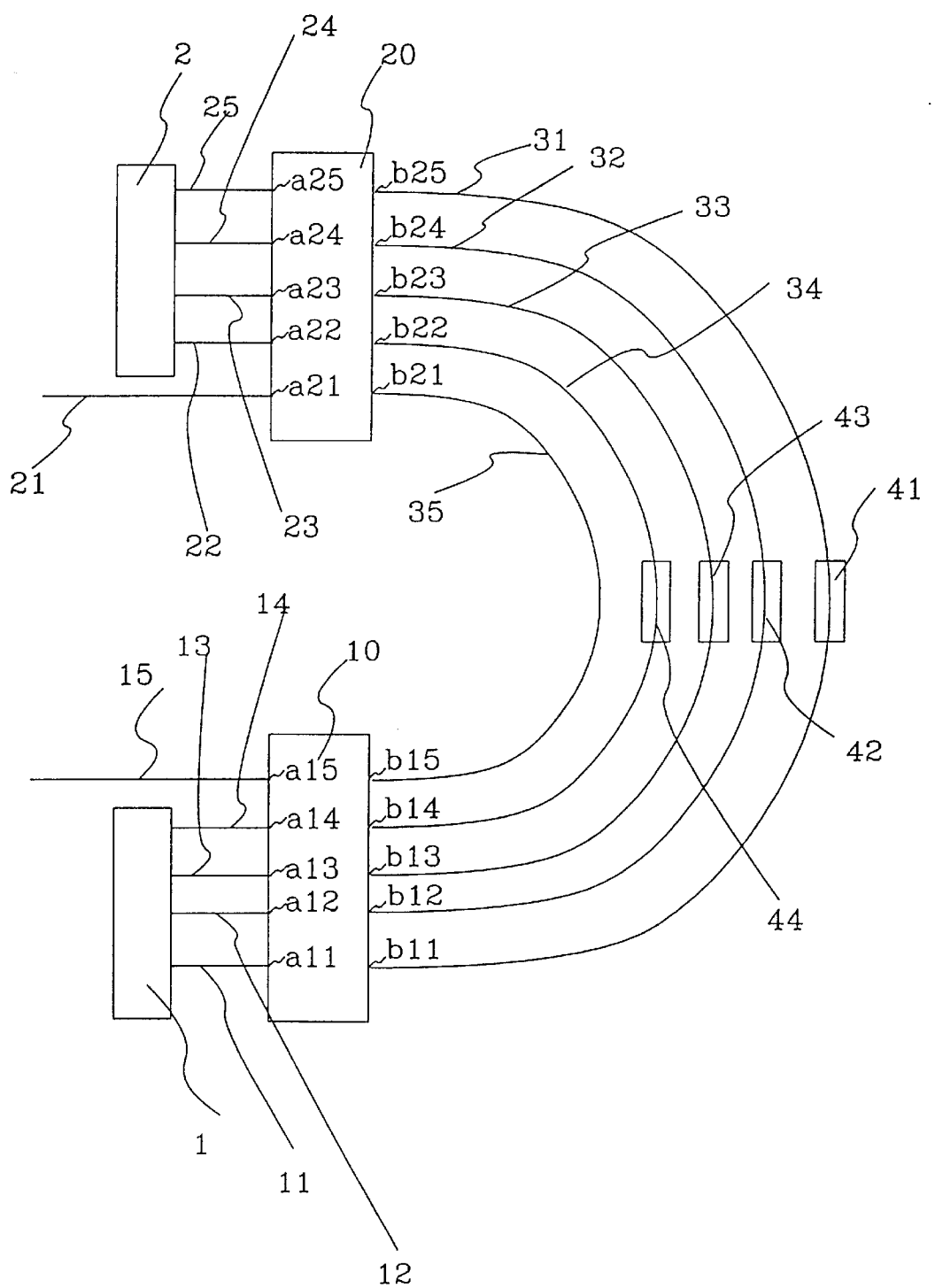
FIG. 1 illustrates an embodiment of an inventive wavelength selecting/WDM transmitter or WDM receiver.

FIG. 1 illustrates an embodiment of a wavelength selecting transmitter in accordance with the invention. The wavelength selecting transmitter includes a first 5×5 MMI waveguide 10 and a second 5×5 MMI waveguide 20, two array lasers 1 and 2 which include four lasers of different carrier frequencies, five Mach-Zehnder waveguides 31, 32, 33, 34 and 35, and four trimming sections 41, 42, 43 and 44. A laser array 1 is coupled with a first, a second, a third and a fourth port a11, a12, a13 and a14 on a first side of the first MMI waveguide 10, via four access waveguides 11, 12, 13 and 14 respectively. A free access waveguide 15 is coupled with port a15 for outgoing wavelength channels on the first side of the first MMI waveguide. On the second side of the first MMI waveguide 10, a first Mach-Zehnder waveguide 31 having a first length is coupled with port b11, a second Mach-Zehnder waveguide 32 having a second length is coupled with port b12, a third Mach-Zehnder waveguide 33 having a third length is coupled with port b13, a fourth Mach-Zehnder waveguide 34 having a fourth length is coupled with port b14 and a fifth Mach-Zehnder waveguide 35 having a fifth length is coupled with port b15. Four Mach-Zehnder waveguides 31, 32, 33 and 34 include respective trimming sections 41, 42, 43 and 44.

A laser array 2 having four lasers is connected on a first side of the second MMI waveguide 20 to a second, a third, a fourth and a fifth port a22, a23, a24 and a25 via respective access waveguides 22, 23, 24 and 25. On a second side of the second MMI waveguide 20, the first Mach-Zehnder waveguide 31 is coupled with port b25, the second Mach-Zehnder waveguide 32 is coupled with port b24, the third Mach-Zehnder waveguide 33 is coupled with port b23, the fourth Mach-Zehnder waveguide 34 is coupled with port b22, and the fifth Mach-Zehnder waveguide 35 is coupled with port b21.

It will be seen that the arrangement illustrated in FIG. 1 can also function as a WDM receiver. At least one wavelength channel is excited into a last port a15 on the first side of the first MMI waveguide 10 and into a first port a21 on the first side of the second MMI waveguide 20. The wavelength channels are excited out from remaining ports on said first side of the first and the second MMI waveguide 10 and 20, different wavelength channels for different ports.

In an optical wavelength selecting transmitter, optical wavelength channels are excited into at least one of the ports a11, a12, a13 and a14 on a first side of the first MMI waveguide 10 from the laser array 1. Optical wavelength channels are excited into at least one of the ports a22, a23, a24 and a25 from the laser array 2 on a first side of the second MMI waveguide 20. The wavelength channels are transmitted through the MMI waveguides and then excited out on the five Mach-Zehnder waveguides 31, 32, 33, 34 and 35 coupled with respective ports b11, b12, b13, b14 and b15 on a second side of the first MMI waveguide 10 and to respective ports b21, b22, b23, b24 and b25 on a second side of the second MMI waveguide 20. Each of the Mach-Zehnder waveguides has a length different to that of the others. The relative length differences determine the channel spacing of the system. So-called trimming sections are provided in four of the five Mach-Zehnder waveguides, for precise trimming of the centre frequencies in this system. The trimming sections can correct or process imperfections. Different types of trimming elements are available. A basic feature of these elements is that the optical wavelength is influenced by changing the refractive level in the waveguide. The refractive index level can be checked by using thermo-optical elements, i.e. the refractive index can be influenced with the aid of heat. Some waveguides can also be influenced in a similar way, by applying an electric field across the waveguide, i.e. the refractive index can be changed electro-optically. SiO2 waveguides can be trimmed, for instance, by irradiating the trimming sections with ultraviolet light, so as to permanently change the refractive index.

The wavelength channels are transmitted through the Mach-Zehnder waveguides 31, 32, 33, 34 and 35 and, in the illustrated case, are influenced by trimming sections in four out of five of said Mach-Zehnder waveguides. The wavelength channels are then excited in from the second side of the second and the first MMI waveguides 20 and 10 respectively, and then transmitted through the MMI waveguides. The. wavelength channels are then excited out on a fifth port a15 on the first side of the first MMI waveguide 10 and a first port a21 on the first side of the second MMI waveguide 20.

Instead of exciting in wavelength channels on at least one of the ports a11, a12, a13 or a14 on the first MMI waveguide and at least one of the ports a22, a23, a24 or a25 on the second MMI waveguide, at least one wavelength channel can be excited into each port a15 and a21. Said wavelength channels are transmitted through the first and the second MMI waveguide 10 and 20. The wavelength channels are then excited out on the Mach-Zehnder waveguides 31, 32, 33, 34 and 35 disposed on the second side of the first and the second MMI waveguides 10 and 20 respectively. The wavelength channels are transmitted through said Mach-Zehnder waveguides 31, 32, 33, 34 and 35 and influenced by trimming sections 41, 42, 43 and 44 in, e.g., four out of the five Mach-Zehnder waveguides. Said wavelength channels are then excited in on the second side of the first and the second MMI waveguides 10 and 20 respectively. The wavelength channels are transmitted through said MMI waveguides 10 and 20 and then excited out on at least one of the ports a11, a12, a13 or a14 on the first side of the first MMI waveguide 10 and on at least one of the ports a22, a23, a24 or a25 on the first side of the second MMI waveguide 20. It can thus be said that the arrangement functions as a WDM receiver.

Figure 2:
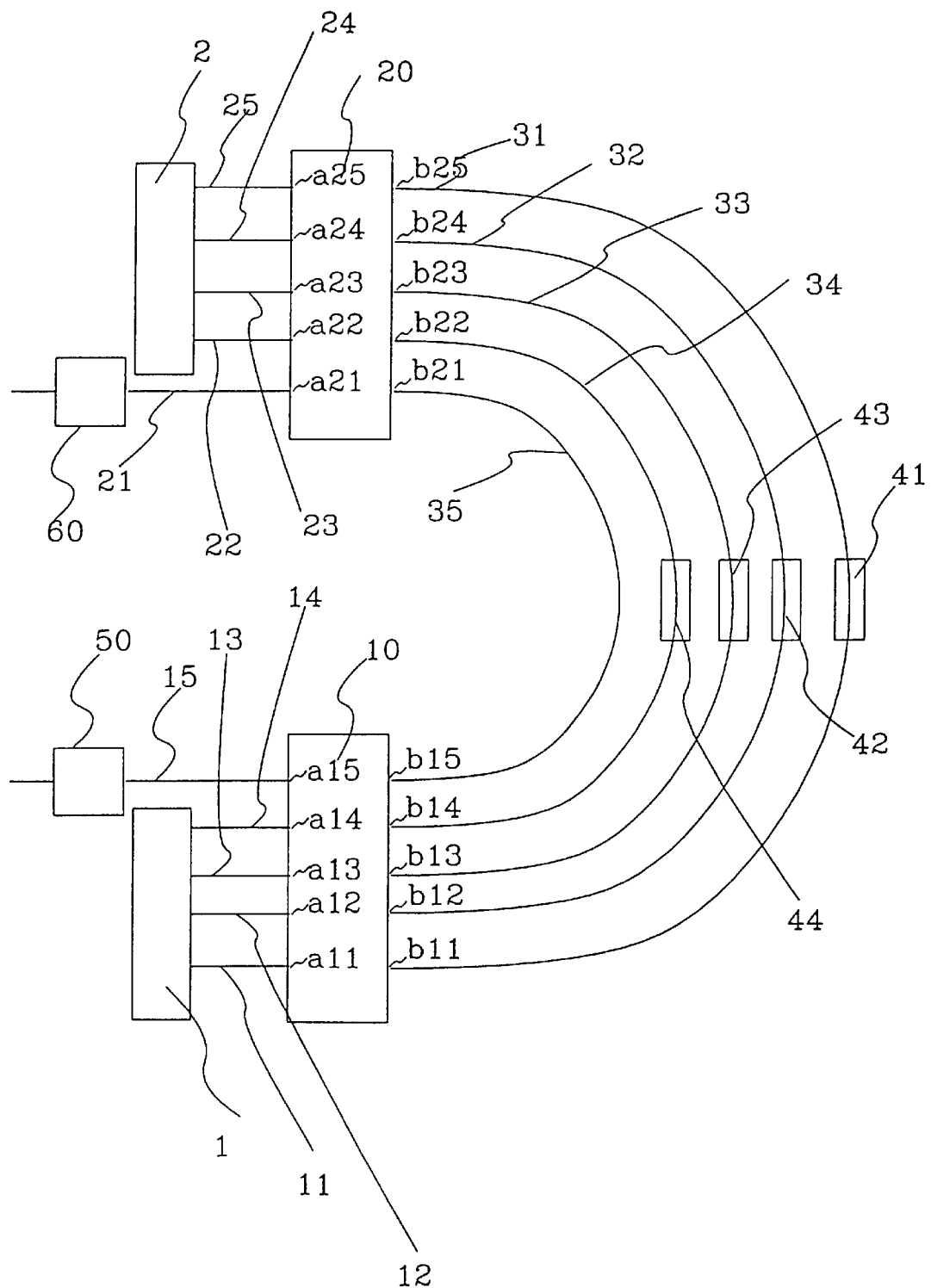
FIG. 2 illustrates another embodiment of an inventive wavelength selecting transmitter.

FIG. 2 illustrates another embodiment of a wavelength selecting transmitter according to the invention. The illustrated wavelength selecting transmitter includes a first 5×5 MMI waveguide 10 and a second 5×5 MMI waveguide 20, two laser arrays 1 and 2, five Mach-Zehnder waveguides 31, 32, 33, 34 and 35 and four trimming sections 41, 42, 43 and 44. A laser array 1 on a first side of the first MMI waveguide 10 is coupled with a first, a second, a third and a fourth port a11, a12, a13 and a14 via four access waveguides 11, 12, 13 and 14. An external modulator 50 is coupled with port a15 on the first side of the first MMI waveguide 10 via an access waveguide 15. On a second side of the first MMI waveguide 10, a first Mach-Zehnder waveguide 31 having a first length is coupled with port b11, a second Mach-Zehnder waveguide 32 having a second length is coupled with port b12, a third Mach-Zehnder waveguide 33 having a third length is coupled with port b13, a fourth Mach-Zehnder waveguide 34 having a fourth length is coupled with port b14, and a fifth Mach-Zehnder waveguide 35 having a fifth length is coupled with port b15. Four Mach-Zehnder waveguides 31, 32, 33 and 34 include a respective one of said trimming section 41, 42, 43 and 44.

A laser array 2 on a first side of the second MMI waveguide 20 is coupled with a second, a third, a fourth and a fifth port a22, a23, a24 and a25 via four access waveguides 22, 23, 24 and 25. An external modulator on the first side of the second MMI waveguide 20 is coupled with port a21 via an access waveguide 21. On a second side of the second MMI waveguide 20, the first Mach-Zehnder waveguide 31 is coupled with port b25, the second Mach-Zehnder waveguide 32 is coupled with port b24, the third Mach-Zehnder waveguide 33 is coupled with port b23, the fourth Mach-Zehnder waveguide 34 is coupled with port b22, and the fifth Mach-Zehnder waveguide 35 is coupled with port b21.

It will be understood that the invention is not restricted to the aforedescribed and illustrated embodiments thereof and that modifications can be made within the scope of the following claims.

What is claimed is:

1. A wavelength selecting transmitter comprising two N×N MMI waveguides (10 and 20), where N≧2, 2(N−1) lasers (1 and 2) and N-number of Mach-Zehnder waveguides (31, 32, 33, 34 and 35), where a first N×N MMI waveguide (10) is coupled with N−1 number lasers (1) and a free access waveguide (15) on a first side and to N-number of Mach-Zehnder waveguides (31, 32, 33, 34 and 35) of mutually different lengths on a second side, where the free access waveguide (15) is coupled with a last port (a15) on the first side of the first MMI waveguide (10), where a second N×N MMI waveguide (20) is coupled with said N-number of Mach-Zehnder waveguides (31, 32, 33, 34 and 35) on a second side and to N−1 lasers (2) and a free access waveguide (21) on a first side, where the free access waveguide (21) is coupled with a first port (a21) on the first side of the second MMI waveguide (20), and where a first to a last Mach-Zehnder waveguide (31, 32, 33, 34 and 35) are arranged between a first to a last port (b11, b12, b13, b14 and b15) on a second side of the first MMI waveguide (10) and a last to a first port (b25, b24, b23, b22 and b21) on a second side of the second MMI waveguide (20).

2. A wavelength selecting transmitter according to claim 1, characterised in that at least one Mach-Zehnder waveguide (31, 32, 33, 34 and 35) includes at least one trimming section (41, 42, 43 and 44).

3. A wavelength selecting transmitter according to claim 2, characterised in that a11 N−1 number of lasers (1) coupled with the first N×N MMI waveguide (10) transmit with mutually different light wavelengths that are the same wavelengths as those transmitted by the N−1 number of different lasers (2) coupled with the second N×N MMI waveguide (20).

4. A wavelength selecting transmitter according to claim 3, characterised in that an external modulator (50 and 60) is coupled with the free access waveguides (15 and 21) disposed on the first and the second MMI waveguides.

5. A wavelength selecting transmitter according to claim 4, characterised in that the external modulator (50 and 60) includes an optical amplifier.

* * * * *